F. H. PIERPONT.
MACHINE FOR THE MANUFACTURE OF GLASS BOTTLES AND OTHER VESSELS.
APPLICATION FILED JULY 3, 1905.
900,037. Patented Sept. 29, 1908.
Fig. 1.
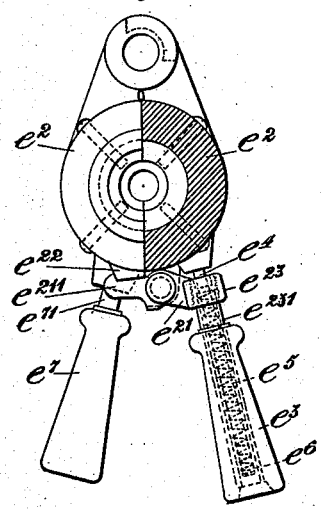
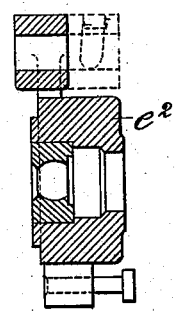
Fig. 2.
Witnesses
G. C. Hunt
E. C. Alexander
Inventor
Frank H. Pierpont
per Church & Church
His Attorneys

UNITED STATES PATENT OFFICE.

FRANK H. PIERPONT, OF HORLEY, ENGLAND, ASSIGNOR, BY MESNE ASSIGNMENTS, TO UNITED BOTTLE MACHINERY CO., A CORPORATION OF NEW YORK.

MACHINE FOR THE MANUFACTURE OF GLASS BOTTLES AND OTHER VESSELS.

No. 900,037.  Specification of Letters Patent.  Patented Sept. 29, 1908.

Original application filed January 26, 1903, Serial No. 140,667. Divided and this application filed July 3, 1905. Serial No. 268,211.

*To all whom it may concern:*

Be it known that I, FRANK HINMAN PIERPONT, a citizen of Great Britain, residing at Horley, in the county of Surrey, England, have invented certain new and useful Improvements in and Relating to Machines for the Manufacture of Glass Bottles and other Vessels, of which the following is a specification.

This invention relates to machines for the manufacture of glass bottles and other vessels, and more especially to the construction which is the subject matter of the prior application for patent No. 140667 dated 26th January 1903, of which this application is a division, said application having resulted in Patent No. 795,304, dated July 25, 1905.

The invention consists in means for self-locking and unlocking the parts of the neck and parison mold on their being respectively closed and opened.

The respective holders of the parison mold parts or the neck or head portion of the parison mold may be provided according to the invention with means for locking the respective parts in position on the closure of the mold, the arrangement being such that by the mere separation of the operating handles the unlocking results.

Figures 1 and 2 illustrate the invention in its application to the neck or head portion of the mold. For the purpose one of the holders $e^2$ or the one of the neck or the main parts of the parison mold itself may be provided with a catch or pawl $e^{21}$, one end $e^{211}$ of which is formed hook shaped to engage in a projection $e^{22}$ provided in the corresponding position upon the other holder $e^2$ or part of the mold. The opposite end $e^{23}$ of the pawl $e^{21}$ carries a handle $e^3$. Within the handle $e^3$ a pin $e^4$ is provided under the action of a spring $e^5$ either in tension or compression, which spring $e^5$ tends to force out the pin $e^4$ against a stop or surface provided on the holder or mold part. On the other holder or mold part a handle $e^7$ is fixedly provided preferably with a tubular and perforated stem $e^{71}$. The arrangement is such that on bringing the two holders $e^2$ or mold parts together for closure, the forward part $e^{211}$ of the pawl rides over the projection $e^{22}$, and by means of the spring $e^5$ aforesaid a locking engagement results. On the pawl handle $e^3$ being separated from the other $e^7$ for the opening of the mold, the spring $e^5$ is compressed and the handle end of the pawl $e^{21}$ gives way to the pressure, thereby releasing the engaging extremity $e^{211}$ of the pawl, so that thus on the separation of the handles the unlocking results.

What I claim as my invention and desire to secure by Letters Patent is.

1. The combination with the parison and neck molds of bottle making machines, of a pawl pivoted to one of said parts, a projection on the other mold part with which the pawl coöperates to lock the parts when brought together, a spring for holding the pawl in locked position, a handle carried by the pawl whereby the initial movement of the handle in a direction to open the parts releases the pawl and unlocks the parts, the continued movement of the handle in the same direction opening the mold.

2. The combination with the parison and neck molds of bottle making machines, of a pawl pivoted on one of said parts, a projection on the other part with which the pawl coöperates to lock the parts when brought together, a hollow handle carried by said pawl, the spring pressed pin within said handle, a stop on the mold part against which the pin is forced and the pawl held in locked position, whereby the initial movement of the handle in a direction to open the parts releases the pawl and unlocks the parts, the continued movement of the handle in the same direction opening the mold.

In witness whereof I have signed my name to this specification in the presence of two subscribing witnesses.

F. H. PIERPONT.

Witnesses:
 WILLIAM EDWARD EVANS,
 GUNTHER LUDWIG LUBKE.